Feb. 6, 1940.                    E. DIETZE                    2,189,026
TAGGING SEAL
Filed Aug. 17, 1939
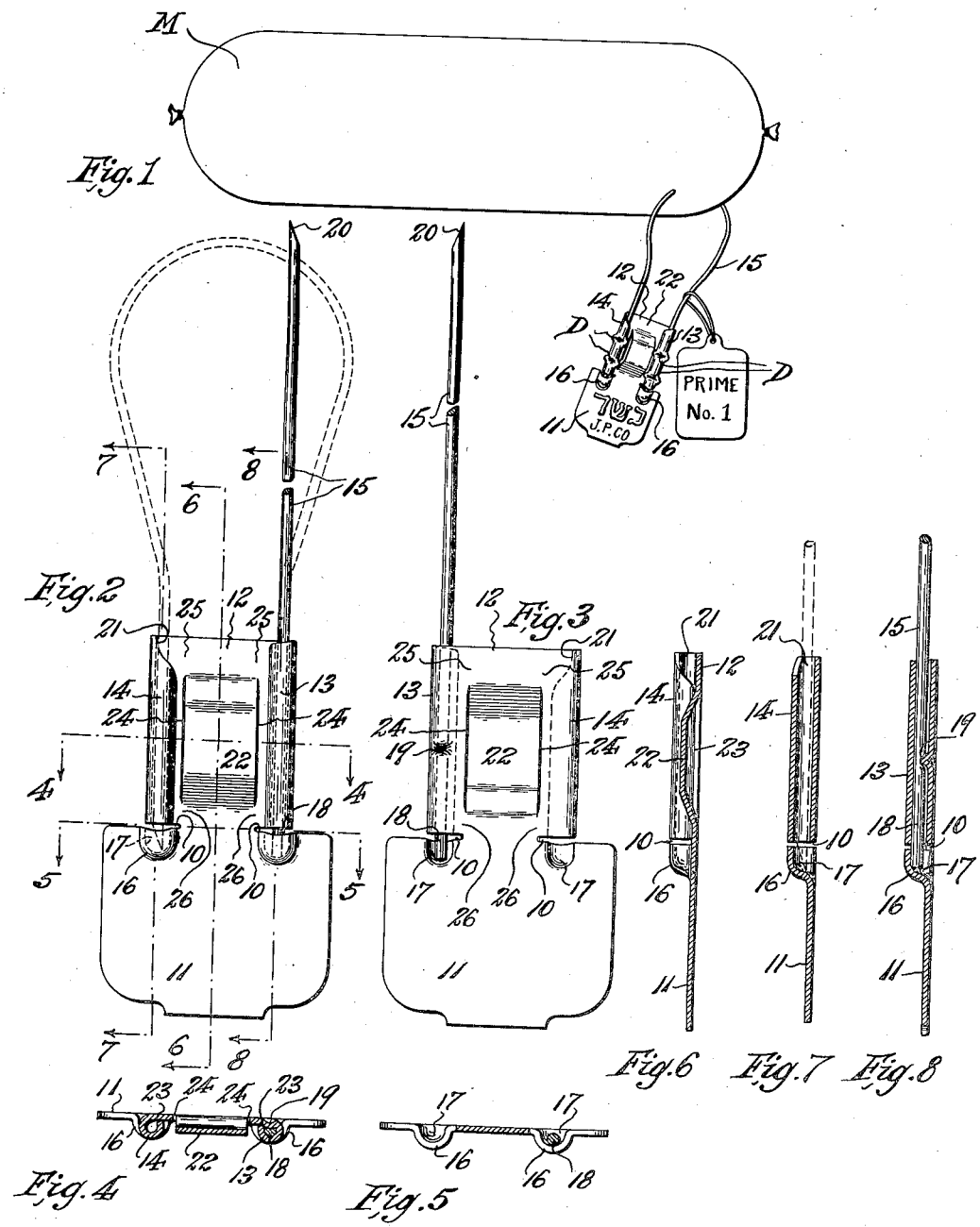
INVENTOR.
Emil Dietze,
BY George D. Richards
ATTORNEY.

Patented Feb. 6, 1940

2,189,026

UNITED STATES PATENT OFFICE 2,189,026

TAGGING SEAL

Emil Dietze, Brooklyn, N. Y., assignor to American Casting & Manufacturing Corporation, Brooklyn, N. Y., a corporation of New York Application August 17, 1939, Serial No. 290,614

10 Claims. (Cl. 292—326)

This invention relates to an improved seal device for tagging meats, poultry and other food products, or for tagging other kinds of merchandise, articles or materials.

This invention has for an object to provide a novel seal device comprising, a sheet metal seal body to which is initially affixed one end portion of a flexible tie-wire, the opposite initially free end portion of which is suitably sharpened whereby, in use, the same may be caused to pierce through the article or material to which the seal is to be applied, and said free end portion thereupon doubled or looped back for engagement in a receiving portion therefor with which said seal body is provided, whereupon, by application of a suitable seal press to the seal body, the wire engaging portions of the latter may be suitably deformed so as to irremovably interlock the engaged end portions of said tie-wire therewith, and thus secure the seal to the article or material against unauthorized removal without disclosure of tampering.

This invention has for another object to provide, in a tagging seal of the kind above characterized, a novel form and construction of sheet metal seal body including deformable rolled tubular coupling members for respectively engaging the respective end portions of the tie-wire, and, cooperative with at least that one of said coupling members which is adapted to receive the free sharpened end portion of the tie-wire, is means to stop and shield the inserted tie-wire extremity, so as to protect the fingers against pricking when manipulating the seal during application thereof to a desired article or material.

The invention has for a further object to provide means for weakening the seal body at points adjacent to the tubular coupling members, whereby any tampering attempt to open up the latter and temporarily release the tie-wire from the grip thereof will result in destruction of the seal with consequent disclosure that it has been tampered with.

A still further object of this invention is to provide, in connection with that tubular coupling member which is adapted to receive insertion of the free sharpened end portion of a tie-wire, a guide means adjacent to the mouth of said coupling member adapted to quickly align the tie-wire end portion therewith, and thereby facilitate the operation of inserting the tie-wire therein, while at the same time avoiding risk of pricking the fingers during such operation.

Other objects of this invention, not at this time more particularly enumerated, will be understood from the following detailed description of the same.

An illustrative embodiment of this invention is shown in the accompanying drawing, in which:

Fig. 1 is a seal device according to this invention as operatively applied and sealed to material to be tagged thereby.

Fig. 2 is a front face view of the novel seal according to this invention; Fig. 3 is a rear face view of the same; Fig. 4 is a transverse sectional view, taken on line 4—4 in Fig. 2; Fig. 5 is a transverse sectional view, taken on line 5—5 in Fig. 2; Fig. 6 is a central longitudinal vertical section through the seal, taken on line 6—6 in Fig. 2; Fig. 7 is a longitudinal sectional view thereof, taken on line 7—7 in Fig. 2; and Fig. 8 is another longitudinal sectional view thereof, taken on line 8—8 in Fig. 2.

Similar characters of reference are employed in the above described views, to indicate corresponding parts.

The novel seal body according to this invention is made from a flat sheet metal blank of substantially rectangular peripheral shape. Extending transversely inward from opposite longitudinal side margins of said blank are indenting slits 10 of a length less than one-half the width of the blank. These slits divide the blank into a lower body section 11 and an upper body section 12, which sections are connected one with the other by the uninterrupted portion of the blank lying between the inner ends of the slits 10. The marginal side portions of the upper body section 12, extending between said slits 10 and the upper free end of said body section 12, are rolled inwardly upon themselves and over the front face of said body section 12, to provide respectively along the respective longitudinal sides of the latter, tubular coupling members 13 and 14, the bores of which are diametrically sized to receive the respective end portions of a tie-wire 15.

Formed in the upper marginal portions of the lower body section 11, which border the transverse indenting slits 10, are combined shield and stop elements. These elements are preferably provided by pressing outwardly from the lower body section material hollow bosses 16 which provide cavities 17 closed at their lower ends but open at their upper ends respectively toward the lower open ends of the tubular coupling members 13 and 14 with which the same are respectively axially aligned.

The tie-wire 15 comprises a suitable length of flexible metallic wire of suitable gauge. The butt end 18 of this tie-wire is inserted through the tubular coupling member 13, until stopped within the adjacent shield and stop boss 16, and is initially fixedly connected to the coupling member 13, and thus to the seal body, in any suitable manner, as e. g. by an indented anchoring key portion 19 pressed inwardly from the wall of said coupling member 13 so as to bite into said butt end 18 of the tie-wire 15, and thus initially secure the same against outward displacement from said coupling member 13 and consequent separation from the seal body.

Initially, said tie-wire 15 extends straight out from the seal body, to which it is attached as above set forth. The outer free extremity of said tie-wire is provided with a suitably formed sharpened end 20, to provide the same with a piercing point.

In the use of the tagging seal of this invention (one such use being its employment as a mark for identifying kosher meat products), the sharpened end 20 of the tie-wire 15 is passed through a portion of the product (such e. g. as the bologna M shown in Fig. 1), and the freely projecting end portion of the tie-wire is thereupon doubled or looped back to oppose the same to the coupling member 14 through which it is passed until stopped by engagement of its extremity with the lower end wall of the adjacent stop and shield boss 16 upon entrance thereof into the cavity 17 of the latter (as shown by broken lines in Fig. 2). In order to facilitate inserting entrance of the sharpened end 20 of the tie-wire 15 through the mouth of said coupling member 14, the inner side top end portions of the wall of the latter are cut away so as to leave, contiguous to the outer side of said coupling member 14, an exposed guide projection or lip 21, against which the sharpened end 20 of the tie-wire may be laid, and thus opposed to and aligned with the bore of said coupling member 14 for assured entrance therein under an applied inward thrust thereupon. This guide projection or lip 21 therefore not only facilitates entrance of the tie-wire end into the coupling member 14, but also eliminates risk of pricking the fingers during such inserting manipulation of the tie-wire.

After the tie-wire is thus manipulated and operatively related to the seal body in use, the tie-wire ends are permanently locked to the seal body by use of a suitable seal press or like tool. The seal press or like tool is preferably so devised as to deform the walls of the coupling members 13 and 14, by crushing the same down upon the entered end portions of the tie-wire, thus interlocking these parts together against separation or withdrawal of the tie-wire. This is indicated in Fig. 1 wherein the interlocking deformations of the coupling members resulting from the action of an applied seal press is indicated at D. If desired, suitable portions of the seal body may be embossed or otherwise marked with a desired design, character or notation by operation of the seal press equipped additionally for such purpose, all as well known to the art.

In order to prevent attempted violation of the seal by prying open the rolled tubular coupling members 13 or 14, the upper body section 12 is provided intermediate said coupling members with an outwardly pressed or raised guard bridge 22, the raised side edges of which are closely adjacent to the inner sides of said coupling members but elevated above the margins 23 of the coupling member formations which abut the surface of said upper body section 12. This raised guard bridge 22 makes it difficult to insert and effectively manipulate a prying tool against said margins 23 with the object of lifting the same and laterally opening up the coupling members to release the tie-wire portions therefrom. Furthermore the side margins of the outwardly struck guard bridge 22 being cut away from the upper body section 12 form slits 24, and thus leave at the opposite ends of said slits weakened portions in the upper body section which will break through under the pressures or strains developed in the attempted application and use of a prying tool in the manner above mentioned. These weakened portions comprise narrow neck-like connections 25 and 26 which respectively lie between the upper ends of said slits 24 and the upper end margin of the body section 12, and between the lower ends of said slits 24 and the transverse slits 10 which extend between the upper and lower body sections 11 and 12.

From the above description thereof it will be obvious that this invention provides a very simple and yet efficient and convenient tagging seal for the purposes intended. I am aware that many changes may be made in the construction and details of the same, without departing from the scope thereof as set forth in the following claims. It is therefore not intended to limit the invention to the exact arrangements and combinations of parts as set forth in the foregoing specification and as shown in the drawing, said description and showing being intended to be interpreted as illustrative and not in a limiting sense.

I claim:

1. A tagging seal comprising, a flat sheet metal body having opposite lateral marginal portions thereof rolled inward thereupon to provide tubular coupling members, a flexible tie-wire having a butt portion inserted in and anchored to one of said coupling members, said tie-wire being adapted to be bent upon itself for insertion of its initially free end portion into the other of said coupling members, a combined stop and shield means pressed outwardly from said body and opposed at least to the inner end of said last mentioned coupling member to receive and stop the tie-wire portion inserted through the latter, and said coupling members being adapted to be deformed by a suitable sealing tool into interlocking relation to the tie-wire portions entered therein.

2. A tagging seal as defined in claim 1, including a raised guard bridge struck outwardly from said body intermediate and closely adjacent to said coupling members, the raised side margins of said guard bridge being divided from said body by open slits whereby breakable sections are formed adjacent to the ends of said coupling members.

3. A tagging seal as defined in claim 1, wherein the outer end portion of that coupling member which receives the free end portion of the tie-wire is cut away to form a guide lip at one side of the entrance into said coupling member.

4. A tagging seal as defined in claim 1, wherein the outer end portion of that coupling member which receives the free end portion of the tie-wire is cut away to form a guide lip at one side of the entrance into said coupling member, and said body includes a raised guard bridge struck outwardly therefrom intermediate and closely adjacent to said coupling members, the raised side margins of said guard bridge being divided from said body by open slits whereby breakable sections are formed adjacent to the ends of said coupling members.

5. A tagging seal comprising, a flat sheet metal body divided by transverse slits indenting its side marginal portions into an upper and a lower section, the lateral marginal portions of the upper section being rolled inwardly upon themselves to provide tubular coupling members, a flexible tie-wire having a butt portion inserted in and anchored to one of said coupling members, said tie-wire being adapted to be bent upon itself for insertion of its initially free end portion into the other of said coupling members, hollow bosses raised from the marginal portions of said lower section which border said indenting transverse slits, said bosses being aligned with and open toward the lower ends of said coupling members so as to provide combined shields and stops to receive and enclose the extremities of the tie-wire portions entered through said coupling members, and said coupling members being adapted to be deformed by a suitable sealing tool into interlocking relation to the tie-wire portions entered therein.

6. A tagging seal as defined in claim 5, including a raised guard bridge struck outwardly from said body intermediate and closely adjacent to said coupling members, the raised side margins of said guard bridge being divided from said body by open slits whereby breakable sections are formed adjacent to the ends of said coupling members.

7. A tagging seal as defined in claim 5, wherein the outer end portion of that coupling member which receives the free end portion of the tie-wire is cut away to form a guide lip at one side of the entrance into said coupling member.

8. A tagging seal as defined in claim 5, wherein the outer end portion of that coupling member which receives the free end portion of the tie-wire is cut away to form a guide lip at one side of the entrance into said coupling member, and said body includes a raised guard bridge struck outwardly therefrom intermediate and closely adjacent to said coupling members, the raised side margins of said guard bridge being divided from said body by open slits whereby breakable sections are formed adjacent to the ends of said coupling members.

9. A tagging seal comprising, a sheet metal body, a tie-wire having a butt portion initially affixed to said body, said body having a tubular formation connected therewith, said tie wire being adapted to be bent upon itself for insertion of its initially free end portion into said tubular formation, a combined stop and shield means connected with said body and disposed in opposition to the inner open end of said wire end receiving tubular formation, and said tubular formation being adapted to be deformed by a suitable sealing tool into interlocking relation to the tie-wire end portion entered therethrough.

10. In a tagging seal as defined in claim 9, wherein the outer end portion of said tubular formation is cut away to form a guide lip at one side the entrance thereinto.

EMIL DIETZE.